July 21, 1942.　　　　　J. H. GENTRY　　　　　2,290,585
TABLE FOR MULTIPLE NEGATIVE DUPLICATOR MACHINES
Filed March 31, 1941　　　2 Sheets-Sheet 2
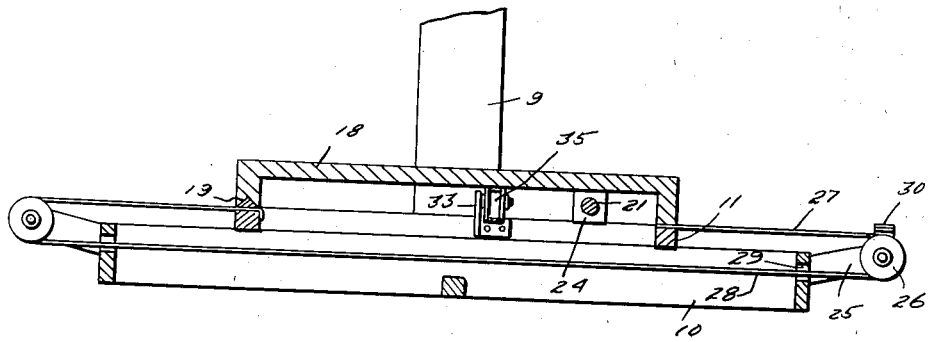
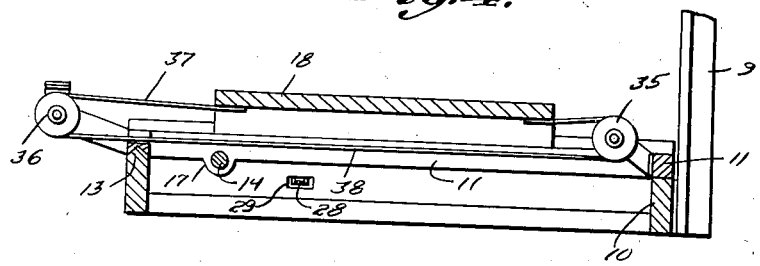
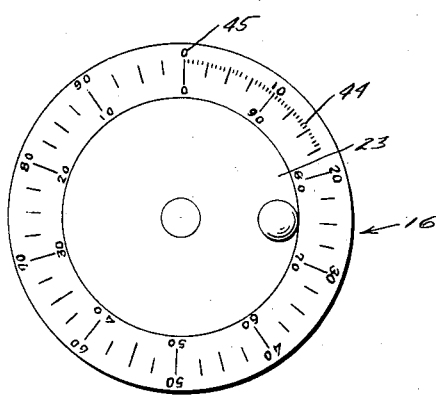
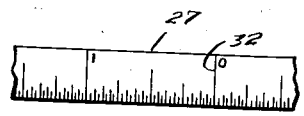
Inventor
JAMES H. GENTRY
By Clarence A. O'Brien
Attorney Patented July 21, 1942

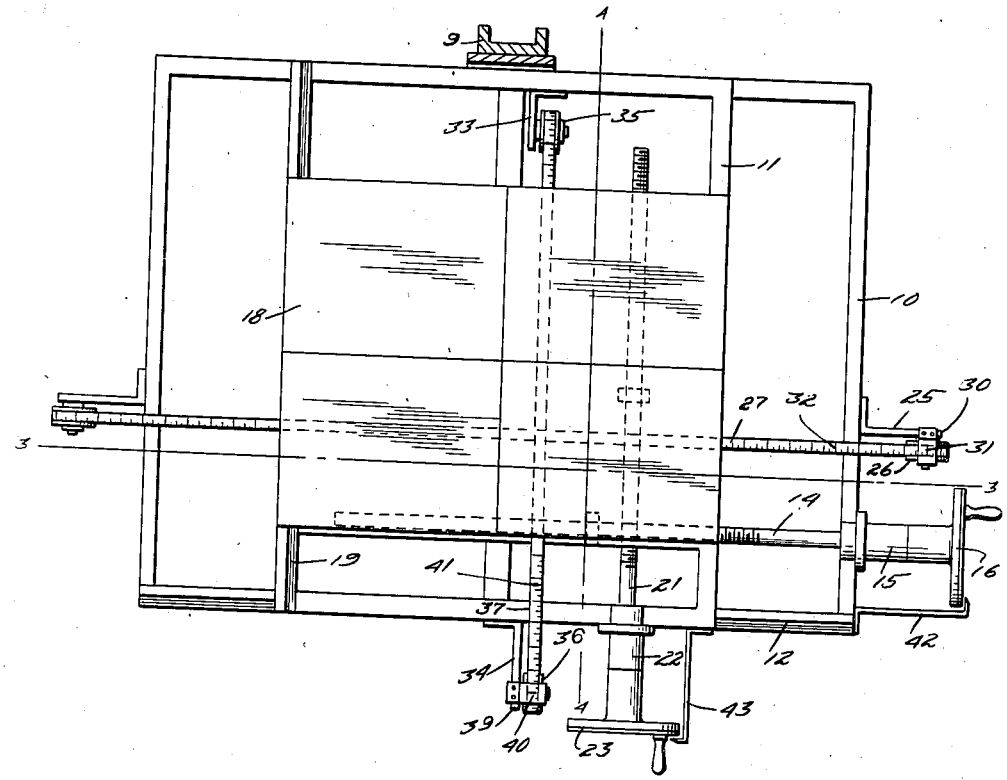

2,290,585

UNITED STATES PATENT OFFICE 2,290,585

TABLE FOR MULTIPLE NEGATIVE
DUPLICATOR MACHINES

James H. Gentry, Philadelphia, Pa.

Application March 31, 1941, Serial No. 386,165

9 Claims. (Cl. 33—184.5)

The present invention relates to new and useful improvements in photographic reproducing devices of a type known as "step and repeat" machines for photographing and lithographing uses, wherein the apparatus includes a chase holder for a photographic negative placed in position in a projection camera for transferring the picture to a sensitized sheet supported in position on the table in the path of the camera whereby to provide a method of duplicating the original negative to many various sizes, quantities and colors.

The present invention relates to an adjustable table for the sensitized sheet on which the picture is reproduced, and has for its primary object to provide an adjustable table for moving the sensitized sheet horizontally either transversely or longitudinally for properly centering the sheet under the camera and further to provide indicating means including a micrometer dial mechanism for indicating to a fine degree the extent of movement of the table and the exact position thereof relative to the camera when the reproductions are made so that the table may be again returned to this exact position at a later time for making subsequent reproductions which will correspond substantially exactly with the reproductions previously made.

A further important object is to provide indicating means for the table of this character of a simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a top plan view of the table of the reproducing machine, and with parts shown in section, Figure 2 is a front elevational view thereof and with parts of the supporting base shown in section, Figure 3 is a sectional view taken substantially on a line 3—3 of Figure 1, Figure 4 is a similar view taken substantially on a line 4—4 of Figure 1, Figure 5 is a plan view of one of the hand wheels for adjusting the table showing the gage displayed thereon, and Figure 6 is a fragmentary plan view of one of the indicating tapes.

Referring now to the drawings in detail, wherein for the purpose of illustration I have disclosed a preferred embodiment of the invention, the numeral 5 designates an open bed frame of substantially rectangular form which is provided at opposite sides with a pair of depending legs 6 to which suspension springs 7 are attached for suspending the frame within a suitable cabinet or other supporting structure 8.

Rising from the rear edge of the frame is an upstanding support 9 providing supporting means for a camera (not shown) which is adjustably supported in an elevated position above the frame in a manner well-known in the art.

The bed 5 includes a lower open frame 10 and an upper open frame 11 with two of their parallel edges arranged in superposed relation, the upper surface of one of said edges of the lower frame 10 being formed with an inverted V 12 constituting a guide seated in the V accommodating groove 13 formed on the under side of the adjacent edge of the upper frame 11 to provide for the longitudinal adjustment of the upper frame 11 on the lower frame 10 in a manner as will be apparent.

Adjustment of the upper frame 11 is accomplished by means of a screw 14 journalled in a bearing 15 secured to the frame 10 and having at its outer end a manipulating wheel 16, the screw having threaded engagement with a lug 17 extending beneath the upper frame 11.

Supported on the upper frame 11 is a plate 18 adapted for adjustment transversely with respect to the direction of adjustment of the upper frame 11, one of the side frame members of the frame 11 being provided with a V-rib 19 which is conformably fitted in the V-groove 20 of the plate 18. Adjustment of the plate is provided by means of a screw 21 journalled adjacent one end in a bearing bracket 22 secured to the frame 11, the outer end of the screw being provided with a manipulating wheel 23 and the screw being threaded to a lug 24 secured to the under side of the plate.

To the upper surface of the plate 18 is secured the film or sensitized sheet (not shown) on which the photograph is to be reproduced. By means of the adjustment of the plate 18 either transversely or longitudinally with respect to the supporting bed, the sensitized sheet may be properly centered beneath the camera.

Projecting outwardly from each side of the lower frame member 10 is a bracket 25 on the outer end of which a pulley 26 is journalled and trained over the pulley at each side of the frame is a steel tape 27 having its lower flight 28 extended through openings 29 formed in the adjacent sides of the frame 10, the ends of the tape being secured to the adjacent sides of the frame member 11, as shown to advantage in Figure 3 of the drawings.

Secured to one of the brackets 25 is an indicator 30 of transparent material which overlies the tape and pulley, the indicator having a marking 31 thereon adapted to register with the scale markings 32 formed on the outer surface of the tape as the tape moves around the pulley under the indicator.

The bracket 33 extends forwardly from the rear edge of the frame 11 and a bracket 34 likewise extends forwardly from the front edge of said frame member, the brackets 33 and 34 having pulleys 35 and 36, respectively, journalled thereon. A steel tape 37 is trained over the pulleys 35 and 36, the lower flight of the pulley indicated at 38 extending under the plate 18 and the ends of the tape are secured to the under side of the plate, as shown to advantage in Figure 4, of the drawings. To the front bracket 34 is also secured a transparent indicator 39 having the marking 40 thereon which is adapted to register with the scale markings 41 on the outer surface of the tape 37.

Secured to the frame 10 is a pointer 42 having an end portion projecting radially inwardly at one edge of the wheel 16 and a similar pointer 43 is secured to the front edge of the frame 11 with its end projecting radially inwardly with respect to the wheel 23. The outer face of each of the wheels 16 and 23 is provided with a scale 44, the scale preferably being marked with one ten-thousandths of an inch and to read in opposite directions from the zero markings 45, the pointers 42 and 43 being positioned immediately adjacent the scale of the respective wheels.

In reproducing negatives such as used in color printing, lithographing and the like, the film is placed on the plate or table 18 in the usual manner for successively aligning in position in the path of the camera. The table is moved longitudinally and transversely by the screws 14 and 21 for this purpose, the graduations on the tapes 27 and 37 being used to indicate the extent of each subsequent movement in accordance with the predetermined distance from each other at which the negatives are to be reproduced on the film. Accordingly, if the table is to be moved $1\frac{1}{16}$ of an inch for each successive reproduction, the tape reading, when registered with its associated marks 31 and 40, will indicate the proper movement of the table.

The graduations of the respective dials 45 on the wheels 16 and 23 will indicate the number of revolutions required by the wheel to produce the desired predetermined movement of the tape in order that the table will travel the exact required distance, the dials thus being used to verify the exact distance at which the tape is moved.

It is believed the details of construction, advantages, and manner of use of the device will be readily understood from the foregoing without further detailed explanation.

What I claim is:

1. A sensitized sheet supporting table for a photographic reproducing apparatus, said table including a frame and a table top mounted for movement in angular direction to each other, means for adjusting the frame and the top in their respective angular directions, position indicating means carried by the adjusting means and movable indicators connected respectively to the frame and top and travelling in any direction of movement of the frame and top and combining with the first named position indicating means to indicate a predetermined position of the table.

2. A sensitized sheet supporting table for a photographic reproducing apparatus, said table including a frame and a table top mounted for movement in angular directions to each other, means for adjusting the frame and the top in their respective angular directions, position indicating means carried by the adjusting means and travelling indicators connected respectively to the frame and the top and movable therewith in accordance with any directional movement thereof.

3. A sensitized sheet supporting table for a photographic reproducing apparatus, said table including a frame and a table top mounted for movement in angular directions to each other, means for adjusting the frame and the top in their respective angular directions, position indicating means carried by the adjusting means, tapes having graduations thereon and connected respectively to the frame and the top for movement therewith in accordance with any directional movement thereof and fixed indicators adjacent said tapes.

4. A sensitized sheet supporting table for a photographic reproducing apparatus, said table including a frame and a table top mounted for movement in angular directions to each other, means for adjusting the frame and the top in their respective angular directions and position indicating means comprising flexible tapes having graduations thereon and attached respectively to the frame and the top for movement therewith and fixed indicators adjacent the tapes.

5. A sensitized sheet supporting table for a photographic reproducing apparatus, said table including a fixed base, a frame mounted on the base for movement in opposite directions, a table top mounted on the frame for movement transversely of the direction of movement of the frame, means for selectively moving the frame and the table top, and position indicating means for the frame and the table top and comprising flexible tapes having graduations thereon and attached at both ends respectively to the frame and to the table top for movement therewith and a fixed indicator adjacent each tape.

6. A sensitized sheet supporting table for a photographic reproducing apparatus, said table including a fixed base, a frame mounted on the base for movement in opposite directions, a table top mounted on the frame for movement transversely of the direction of movement of the frame, manipulating screws for the frame and for the table top, a hand wheel for each screw, a dial on each wheel, a fixed pointer adjacent each dial, flexible tapes attached at both ends respectively to the frame and to the table top for movement therewith, each of said tapes having graduations thereon and a fixed indicator adjacent each tape.

7. A sensitized sheet supporting table for photographic reproducing apparatus, said table including a fixed base, a frame mounted on the base for movement in opposite directions, a table top mounted on the frame for movement transversely of the direction of movement of the frame, manipulating screws for the frame and for the table top, a hand wheel for each screw, a dial on each wheel, a fixed pointer adjacent each dial, a flexible tape having its ends attached to opposite edges of the frame, pulleys having fixed supports over which the tape is trained, a flexible tape having its ends attached to opposite edges of the table top, pulleys having supports fixed relative to the table top and over which the second tape is trained, each of said tapes having graduations thereon and fixed pointers adjacent each tape.

8. A sensitized sheet supporting table for a photographic reproducing apparatus, said table including a frame and a table top mounted for movement in angular directions to each other, means for adjusting the frame and the top in their respective angular directions, position indicating means carried by the adjusting means and endless position indicating tapes carried by the frame and the table top for movement respectively therewith.

9. A sensitized sheet supporting table for a photographic reproducing apparatus, said table including a frame and a table top mounted for movement in angular directions to each other, means for adjusting the frame and the top in their respective angular directions, position indicating means carried by the adjusting means, endless position indicating tapes having graduations thereon and carried respectively by the frame and the table top for movement therewith and fixed pointers supported in cooperating position with the tapes.

JAMES H. GENTRY.